(12) United States Patent
Rao et al.

(10) Patent No.: US 11,328,627 B2
(45) Date of Patent: May 10, 2022

(54) APPARATUS, METHOD AND SYSTEM FOR MANAGEMENT OF ELECTRONIC SHELF LABEL, AND STORAGE MEDIUM

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Yang Rao, Beijing (CN); Peng Qin, Beijing (CN); Zhongli Luo, Beijing (CN); Bo Wang, Beijing (CN); Juncai Ai, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

(*) Notice: Subject to any disclaimer, the term of this patent is extended or adjusted under 35 U.S.C. 154(b) by 210 days.

(21) Appl. No.: 16/393,353

(22) Filed: Apr. 24, 2019

(65) Prior Publication Data
US 2019/0333421 A1 Oct. 31, 2019

(30) Foreign Application Priority Data
Apr. 25, 2018 (CN) .......................... 201810379405.9

(51) Int. Cl.
*G09F 3/20* (2006.01)
*H04W 4/35* (2018.01)
(Continued)

(52) U.S. Cl.
CPC ................ *G09F 3/208* (2013.01); *B65C 9/38* (2013.01); *G06K 19/07758* (2013.01); *G06Q 10/06316* (2013.01); *H04W 4/35* (2018.02)

(58) Field of Classification Search
CPC .... G09F 3/208; H04W 4/35; G06Q 10/06316
See application file for complete search history.

(56) References Cited

U.S. PATENT DOCUMENTS

2006/0283942 A1* 12/2006 Nagamachi ............ G06Q 30/06
235/383
2014/0177008 A1 6/2014 Raymond et al.
(Continued)

FOREIGN PATENT DOCUMENTS

| CN | 101789095 A | 7/2010 |
| CN | 102019767 A | 4/2011 |

(Continued)

OTHER PUBLICATIONS

First Chinese Office Action Application No. 201810379405.9; dated Sep. 17, 2020.
(Continued)

*Primary Examiner* — Gary C Hoge

(57) ABSTRACT

Provided are apparatus and method for management of electronic shelf label. The apparatus for management of electronic shelf label, ESL, including an ESL mainboard and a plurality of ESL small boards, wherein the ESL mainboard sends task commands to the plurality of ESL small boards through a first logic signal; and each ESL small board of the plurality of ESL small boards includes a receiving portion and a display portion, the receiving portion receives, through the first logic signal, a command for a task corresponding to the ESL small board as sent by the ESL mainboard, and the display portion displays the task.

17 Claims, 5 Drawing Sheets

(51) Int. Cl.
  *B65C 9/38*   (2006.01)
  *G06K 19/077* (2006.01)
  *G06Q 10/06*  (2012.01)

(56) References Cited

U.S. PATENT DOCUMENTS

| | | | | |
|---|---|---|---|---|
| 2015/0095974 A1* | 4/2015 | Lee | ....................... | H04L 9/3226 |
| | | | | 726/1 |
| 2015/0278928 A1* | 10/2015 | Nichols | .............. | G06Q 30/0639 |
| | | | | 705/26.9 |
| 2016/0150106 A1 | 5/2016 | Boot et al. | | |
| 2017/0279481 A1* | 9/2017 | Rossl | ..................... | G08C 19/00 |
| 2017/0287025 A1* | 10/2017 | Kim | ........................ | G06Q 30/06 |
| 2018/0033342 A1* | 2/2018 | Olibrice | .................. | G09F 3/204 |

FOREIGN PATENT DOCUMENTS

| | | |
|---|---|---|
| CN | 104707806 A | 6/2015 |
| CN | 104815800 A | 8/2015 |
| CN | 107622219 A | 1/2018 |

OTHER PUBLICATIONS

The Second Chinese Office Action dated Jul. 5, 2021; Appln. No. 201810379405.9.

\* cited by examiner

APPARATUS, METHOD AND SYSTEM FOR MANAGEMENT OF ELECTRONIC SHELF LABEL, AND STORAGE MEDIUM

TECHNICAL FIELD

The present disclosure relates to management of electronic shelf label, and more particularly, to an apparatus and method for management of electronic shelf label.

BACKGROUND

Traditional paper labels depend on requirement forms so as to instruct to perform order-picking operations, operators need to be aware of the storage environment and the product attributes. If the operators are unfamiliar with the work, it is easy to cause picking errors, and the work speed and efficiency are very low.

Electronic shelf label (ESL) is an electronic display device that is placed on a shelf and can replace traditional paper labels. Each ESL is connected to a server database through the network, and requirement information is displayed through a display on the ESL. At present, there are many ways to connect the ESL to the server database, such as RS-485, CAN bus connection, etc., but because of a relatively long transmission distance between the ESL and the server database, as the transmission distance increases, the transmission rate will decrease, and it may also result in decrease of transmission stability.

SUMMARY

According to an aspect of the present disclosure, there is provided an apparatus for management of electronic shelf label, ESL, comprising an ESL mainboard which sends task commands to the plurality of ESL small boards through a first logic signal; and a plurality of ESL small boards including receiving portions and display portions, the receiving portion of each ESL small board of the plurality of ESL small boards receives, through the first logic signal, a command for a task corresponding to each ESL small board as sent by the ESL mainboard, and the display portion displays the task.

According to an aspect of the present disclosure, wherein the first logic signal is a high voltage level or a low voltage level of general purpose input output.

According to an aspect of the present disclosure, wherein the display portion of the ESL small board further displays a task completion status.

According to an aspect of the present disclosure, wherein the receiving portion of the ESL small board receives a task completion feedback, and the display portion of each ESL small board indicates a task completion.

According to an aspect of the present disclosure, wherein the display portion of the ESL small board includes a display, which is caused to emit light so as to indicate a task when the ESL small board receives a command for a task.

According to an aspect of the present disclosure, wherein when the receiving portion of the ESL small board receives a task completion feedback, the display is caused to light off to indicate a task completion.

According to an aspect of the present disclosure, wherein the ESL small board further comprises a sensor that detects an operation of the material on an automatic shelf being transported and provides a task completion feedback to the receiving portion of the ESL small board.

According to an aspect of the present disclosure, wherein the ESL small board further includes a restorer that detects a reset operation of a user and provides a task completion feedback to the receiving portion of the ESL small board.

According to an aspect of the present disclosure, wherein the ESL small board further includes a stripper that ejects a paper label after detecting a stripping operation and provides a task completion feedback to the receiving portion of the ESL small board.

According to an aspect of the present disclosure, there is provided a method for management of electronic shelf label, ESL, comprising: sending, by using an ESL mainboard, a command for a task to each ESL small board of a plurality of ESL small boards through a first logic signal; and receiving, by using each ESL small board, a command for a task corresponding to each ESL small board as sent by the ESL mainboard, and displaying, by using each ESL small board, the task.

According to an aspect of the present disclosure, wherein the method further comprises displaying a task completion status by using the ESL small board.

According to an aspect of the present disclosure, wherein the method further comprises receiving a task completion feedback and indicating a task completion, by using the ESL small board.

According to an aspect of the present disclosure, the ESL small board includes a display, the method further comprises: when the ESL small board receives a command for a task, causing the display to emit light so as to indicate a task.

According to an aspect of the present disclosure, wherein when the ESL small board receives a task completion feedback, causing the display to light off so as to indicate a task completion.

According to an aspect of the present disclosure, wherein the ESL small board further includes a stripper, and the method further comprises, after the stripper detects a stripping operation, ejecting a paper label by using the stripper, and generating a task completion feedback.

According to an aspect of the present disclosure, the first logic signal is a high voltage level or a low voltage level of general purpose input output (GPIO).

According to another aspect of the present disclosure, there is provided a system for management of electronic shelf label, ESL, comprising a remote server, a controller, an ESL mainboard and a plurality of ESL small boards, wherein the remote server is connected to the controller through the internet; the controller is connected to the ESL mainboard through a control interface; the ESL mainboard is configured to send task commands to the plurality of ESL small boards through a first logic signal; and each ESL small board of the plurality of ESL small boards is configured to receive a command for a task corresponding to each ESL small board as sent by the ESL mainboard and display a task.

According to another aspect of the present disclosure, there is provided a computer-readable storage medium having stored thereon instructions that, when executed by a processor, cause the processor to perform the method for management of ESL as disclosed above.

BRIEF DESCRIPTION OF THE DRAWINGS

Through the more detailed description of embodiments of the present disclosure with reference to the accompanying drawings, the above and other objectives, features, and advantages of the present disclosure will become more apparent. The drawings are to provide further understanding for the embodiments of the present disclosure and constitute a portion of the specification, and are intended to interpret the present disclosure together with the embodiments rather than to limit the present disclosure. In the drawings, the same reference sign generally refers to the same component or step.

DETAILED DESCRIPTION OF THE EMBODIMENTS

Hereinafter, the technical solutions in the embodiments of the present disclosure will be described clearly and completely with reference to the accompanying drawings thereof. Obviously, these described embodiments merely are only part of the embodiments of the present disclosure, rather than all of the embodiments of the present disclosure. All other embodiments obtained by a person of ordinary skill in the art without paying inventive efforts should all fall into the protection scope of the present disclosure.

As mentioned above, at present, there are many ways to connect the ESL to the server database, such as RS-485, CAN bus connection, etc., but as the transmission distance between the ESL and the server database increases, the transmission rate will decrease and it may also result in a decrease in transmission stability. Therefore, it is recognized that a new apparatus or method for management of ESL is desired to solve the above problems.

In order to make the objectives, the technical solutions and the advantages of the present disclosure more apparent, the exemplary embodiments according to the present disclosure will be described in detail below with reference to the accompanying drawings.

Figure 1:
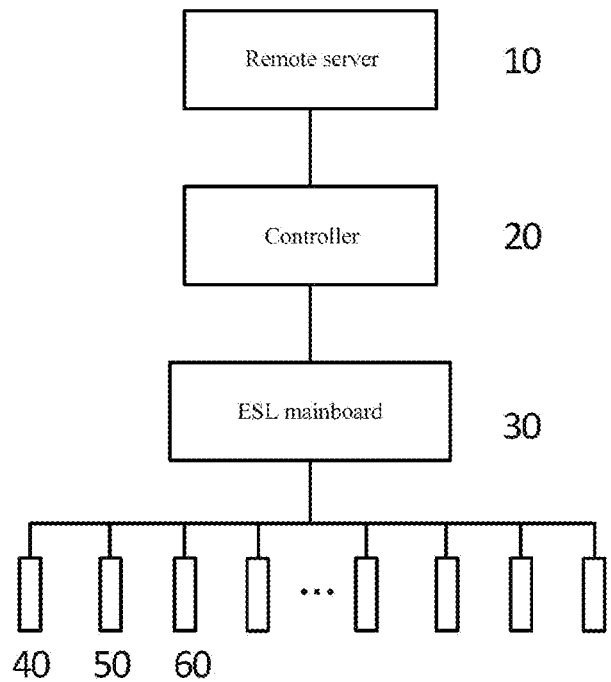
FIG. 1 shows a schematic diagram of architecture of the system for management of ESL according to embodiments of the present disclosure.

First, architecture of the system for management of ESL according to embodiments of the present disclosure will be described with reference to FIG. 1. As shown in FIG. 1, architecture of the system for management of ESL according to the present disclosure comprises a remote server 10, a controller 20, an ESL mainboard 30 and a plurality of ESL small boards, the plurality of ESL small boards include ESL small boards 40, 50, 60, etc.

As shown in FIG. 1, the remote server 10 is connected to the controller 20 through the internet, and the controller 20 is connected to the ESL mainboard 30 through a control interface such as USB. The ESL mainboard 30 sends commands to the plurality of ESL small boards through a first logic signal.

For example, one ESL mainboard 30 may be connected to 120 ESL small boards. For example, in the application scenario of electronic shelf material sorting management, one ESL small board may correspond to one type of material, that is, one ESL mainboard 30 can control 120 different types of material. In the application scenario of affixing labels, also, one ESL small board may correspond to one type of paper label, that is, one ESL mainboard 30 can control 120 types of different paper labels. For example, the ESL mainboard 30 may be fixed in one position, and the ESL small boards connected to the ESL mainboard 30 may be dispersed on the corresponding material rack or label holder. It should be recognized that the number of ESL small boards to which the ESL mainboard may be connected is not limited thereto, and the ESL mainboard may be connected to more or less ESL small boards as needed.

Figure 2:
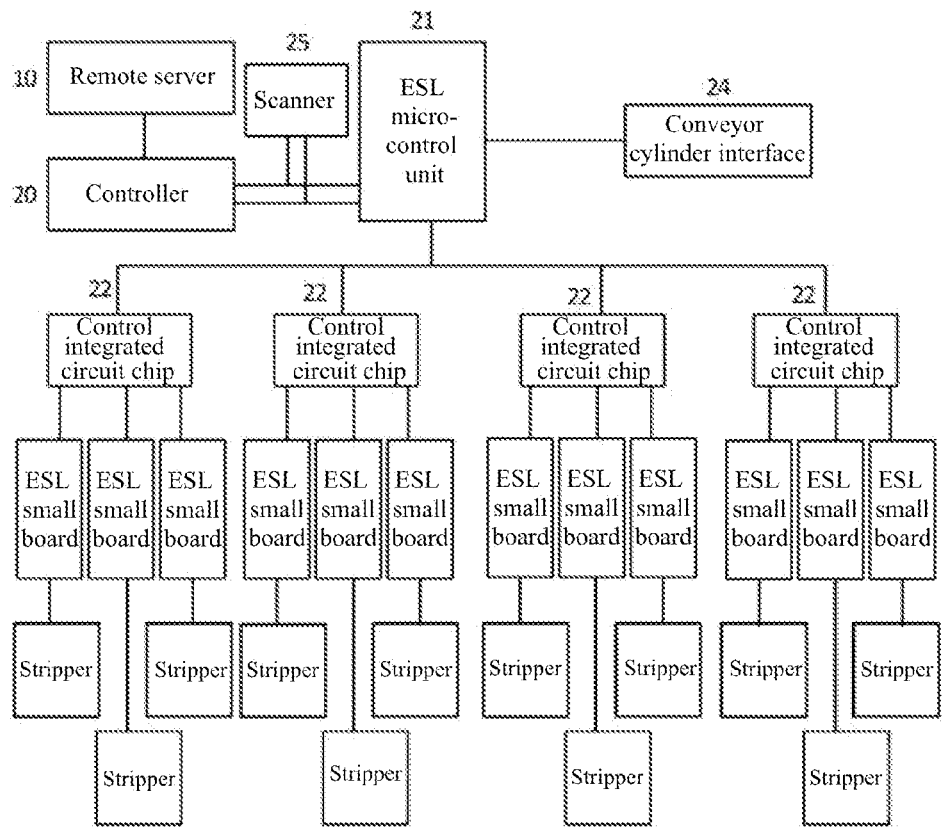
FIG. 2 shows a schematic diagram of principle architecture of circuit of the system for management of ESL according to embodiments of the present disclosure.

Next, principle architecture of circuit of the system for management of ESL according to embodiments of the present disclosure will be described below with reference to FIG. 2. The system for management of ESL may comprise an apparatus for management of ESL according to the present disclosure. According to some embodiments of the present disclosure, the apparatus for management of ESL may be implemented as an electronic shelf apparatus. As shown in FIG. 2, the apparatus for management of ESL in the circuit of system for management of ESL according to the present disclosure may comprise an ESL mainboard, wherein the ESL mainboard is integrated with, for example, an ESL micro-control unit 21 and a plurality of control integrated circuit chips 22, the ESL micro-control unit 21 integrated in the ESL mainboard may also be connected to the controller 20 via a control interface such as USB, and the controller 20 is connected to the remote server 10 through the internet, thereby implementing control over the ESL mainboard by the remote server 10.

In the application scenario of electronic shelf material sorting management, for example, the ESL micro-control unit 21 integrated in the ESL mainboard may also be connected to a conveyor cylinder interface 24, thereby enabling automation and industrialization of the entire process by controlling operations of the pipeline conveyor.

In the application scenario of affixing labels, for example, the ESL micro-control unit 21 integrated in the ESL mainboard may also be connected to a scanner 25, such as a barcode scanner, so that a control operator who manages the ESL in the ESL management operation can scan the label by the scanner 25 to obtain label information and sending it to the ESL mainboard, then the ESL mainboard determines the corresponding ESL small board based on the scanned label information, thereafter the ESL mainboard sends a command for a task to the corresponding ESL small board. It should be recognized that the scanner may also be used to scan material related information in the application scenario of electronic shelf material sorting management, for example, label information of material, etc., so that the command for a task is sent by the ESL mainboard to the corresponding ESL small board.

As shown in FIG. 2, each ESL small board of the plurality of control integrated circuit chips 22 integrated in the ESL mainboard may be connected to a plurality of ESL small boards. For example, as shown in FIG. 2, there are 4 control integrated circuit chips 22 connecting to the ESL mainboard, wherein each control integrated circuit chip 22 may be connected to 30 ESL small boards, then 4 control integrated circuit chips 22 may be connected to 120 ESL small boards, and further, task commands are sent to the ESL small boards through the first logic signal, thereby realizing diversification of ESL management. According to embodiments of the present disclosure, the first logic signal may be a high voltage level or a low voltage level of general purpose input output (GPIO). For example, in the system for management of ESL, a command for a task may be sent from the ESL mainboard to the ESL small boards through a high voltage level of GPIO. Since GPIO has only two states of high voltage level (logic 1) and low voltage level (logic 0), it can be immune to external environment, has high stability, and has no distance and transmission rate limitations.

In the application scenario of affixing labels, for example, the ESL small board 40 may also be connected to a stripper 23, such as a label stripper, when the ESL management architecture is adopted for quickly affixing labels to products, after an operator takes the corresponding label, the stripper 23 can automatically spit out the next paper label for realizing automated management.

It should be realized that the above-described control integrated circuit chips 22 integrated on the ESL mainboard are not limited thereto, and more or less control integrated circuit chips 22 or other chips may be integrated on the ESL mainboard as needed, and the number of ESL small boards controlled by each control integrated circuit chip 22 is not limited thereto, the number of connected ESL small boards can be flexibly controlled as needed. In addition, the device or equipment to which the above system for management of ESL is connected is merely exemplary, it may be connected to more/less devices or equipment according to actual scenarios or actual needs, and circuit of the system for management of ESL may not need to be connected to all the devices or equipment shown in FIG. 2, circuit of the system for management of ESL may also be connected to devices or equipments other than all of those shown in FIG. 2 as needed.

The apparatus for ESL management and the method for ESL management according to the embodiments of the present disclosure may be applied to works such as factory warehouse material sorting management, inbound and outbound warehouse inquiry, factory pipeline operation, and product quick labeling of factory pipeline, etc. Before operations such as material sorting management, inbound and outbound inquiry, and product quick labeling of factory pipeline are performed, it needs to maintain the material/label on the corresponding ESL small board in advance for easy management. A material pre-maintenance manner according to embodiments of the present disclosure will be described below with reference to FIG. 3.

Figure 3:
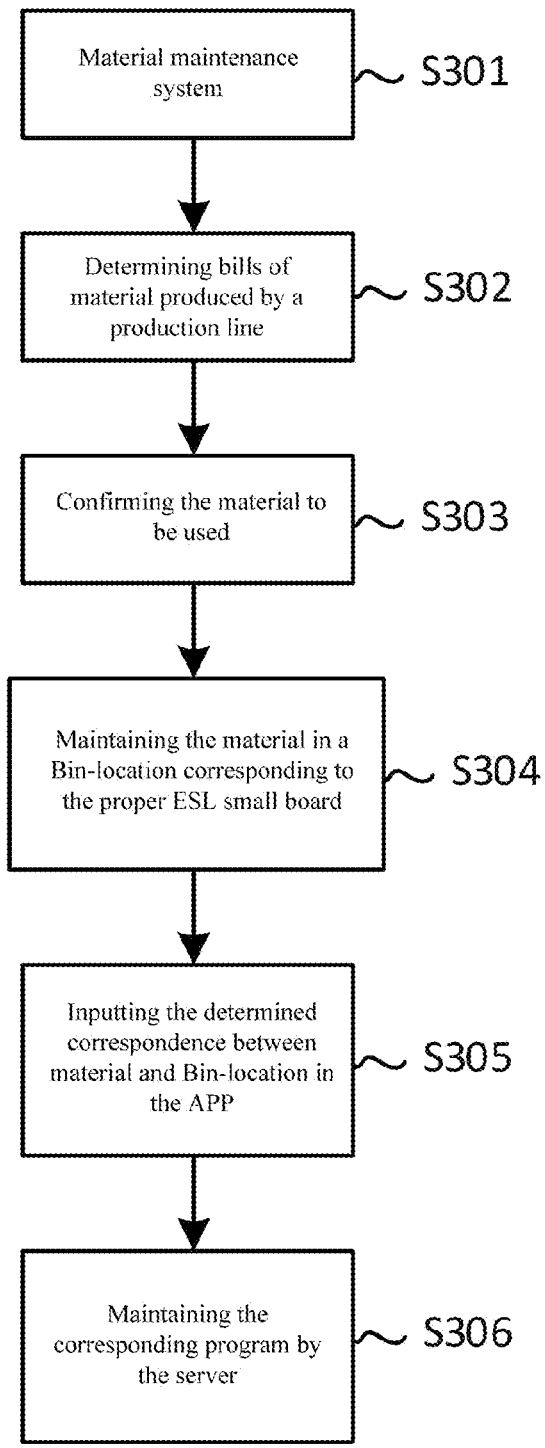
FIG. 3 shows steps of a pre-maintenance manner of material according to embodiments of the present disclosure.

As shown in FIG. 3, material pre-maintenance needs to first establish a material maintenance system by the remote server 10 (S301). For example, the material maintenance system may be computer software or mobile client software (e.g., an APP). A line operator then determines bills of all material produced by a production line (S302). For example, the bills may include quantity, name, attributes, QR code information, initial serial number, and so on of the material. Next, the line operator confirms the material to be used (S303). For example, the bills of material may include 1000 types of material, and the line operator confirms that the 100 types of material need to be used. After determining the material to be used, the line operator maintains the material in a Bin-location corresponding to the proper ESL small board (S304). For example, the material a is placed at the Bin-location corresponding to the ESL small board, it may be maintained according to characteristics of the material. After Bin-location information of the ESL small board corresponding to each material is determined, the determined correspondence between material and Bin-location may be inputted in the computer software or the APP (S305). Finally, the corresponding program is maintained by the server (S306). The material pre-maintenance process is completed till now. When a new material needs to be added to the maintenance system during pre-maintenance of material, steps S303-S306 are continuously iterated. It should be recognized that the pre-maintenance process of material mentioned above is also applicable to maintenance of paper labels and the like during label affixing, and details will not be described herein.

After pre-maintenance of material is completed, the correspondence between material and Bin-location has been stored in the remote server 10. Next, ESL management can be implemented by the remote server 10, the controller 20, the ESL mainboard 30 and a plurality of ESL small boards.

Management manners of the apparatus according to some embodiments of the present disclosure being applied to material sorting and quickly affixing labels to products will be separately described in detail below.

In the application of material sorting, traditional material sorting management requires the line operator to know material characteristics and storage environment, if the operator is unfamiliar with work, it is easy to cause material sorting errors, so the traditional material sorting management has very low work speed and efficiency. The present disclosure can place a plurality of ESL small boards centrally in a certain position on the production line, wherein one ESL small board represents one type of material, thereby realizing centralized and automatic management of material.

In some embodiments of the present disclosure, the apparatus for management of ESL comprises an ESL mainboard, the ESL mainboard sends task commands to ESL small boards through a first logic signal. The apparatus for management of ESL further comprises a plurality of ESL small boards each of which includes a receiving portion and a display portion, wherein the receiving portion of each ESL small board receives, through the first logic signal, a command for a task corresponding to each ESL small board as sent by the ESL mainboard, and the display portion of each ESL small board displays the task.

The first logic signal is a high voltage level or a low voltage level. For example, the first logic signal is a high voltage level or a low voltage level of general purpose input and output. The ESL mainboard sends task commands to the ESL small boards through the first logic signal refers to that, when a command for a task of the ESL mainboard corresponds to one of the ESL small boards, the ESL mainboard sends the command for the task to this ESL small board through, for example, a high voltage level. Alternatively, the ESL mainboard may also send task commands to the ESL small boards by, for example, a low voltage level, which may be preset in the ESL mainboard.

Herein, for example, the command for the task may correspond to command information inputted by the control operator at the ESL mainboard. For example, the ESL mainboard may be connected to a device such as a scanner, and can identify the material by code scanning, when the line operator wants to obtain certain material, the control operator can scan the material by the scanner at the ESL mainboard and then inputs the material identification information (e.g., RQ code information of the material) obtained by scanning to the ESL mainboard, then the ESL mainboard determines the corresponding ESL small board based on the scanned material information, next, the ESL mainboard sends a command for a task to the corresponding ESL small board through the first logic signal.

For example, the command for the task may also correspond to material information inputted directly by the control operator on the controller 20. For example, the material name inputted at the controller 20 is sent by the controller 20 to the ESL mainboard, and then sent by the ESL mainboard to the corresponding ESL small board through the first logic signal. Alternatively, the command for the task may be automatically generated corresponding to one operation in an operation sequence/flow set in advance. For example, the operation sequence may be preset, such as order-picking, label affixing, etc., and when the pipeline is to perform the order-picking operation, a command for a task for the picking operation may be automatically generated.

Next, the receiving portion of each ESL small board receives the command for the task corresponding to each ESL small board as sent by the ESL mainboard through the first logic signal, and the display portion of each ESL small board displays the task.

In addition, the display portion of the ESL small board also displays a task completion status. In one example, the receiving portion of the ESL small board receives a task completion feedback and indicates a task completion by the display portion of each ESL small board.

Architecture of the ESL small board according to some embodiments of the present disclosure is described below with reference to FIG. 4.

Figure 4:
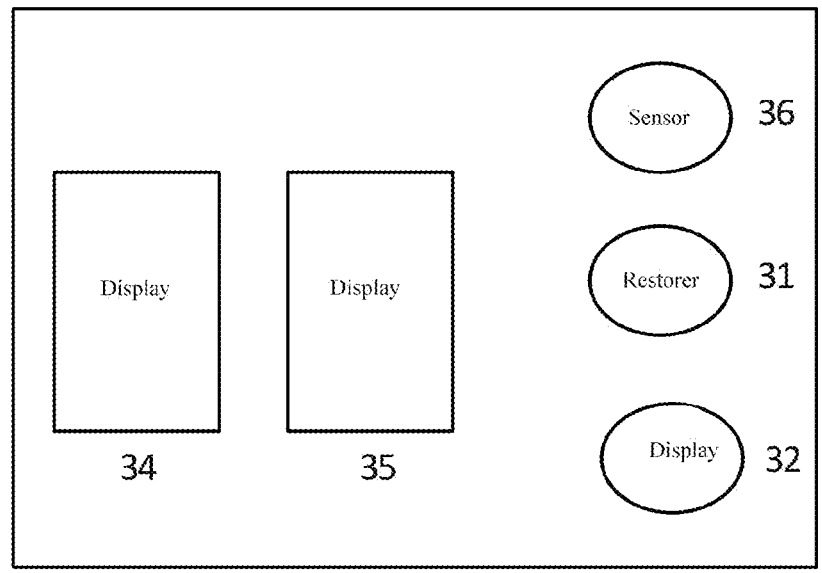
FIG. 4 shows a schematic diagram of architecture of ESL small boards according to some embodiments of the present disclosure.

As an example, as shown in FIG. 4, the display portion of the ESL small board may include a display 32, which is caused to emit light so as to indicate a task when the ESL small board receives a command for a task. For example, the display 32 may be a display lamp. For example, when the receiving portion of the ESL small board receives a command for a task sent by the ESL mainboard, the display 32 on the ESL small board emits light, so that the line operator can quickly locate this ESL small board.

When the receiving portion of the ESL small board receives a task completion feedback, the display 32 is caused to light off to indicate a task completion. Alternatively, the display 32 may indicate a task by displaying a different color (discoloration). For example, the display 32 may show red (a first color) to indicate a task and green (a second color) to indicate a task completion.

For example, the ESL small board further includes a sensor 36, the sensor 36 detects an operation of the material on an automatic shelf being transported and provides a task completion feedback to the receiving portion of the ESL small board. During material sorting management, when the ESL small board receives the task of taking the material located at the ESL small board as sent from the ESL mainboard, the sensor 36 may be disposed at the ESL small board, after the small board receives the task, for example, the material at the ESL small board can be placed on the automatic shelf by a robot hand or the line operator, and the sensor 36 on the ESL small board detects removal of the material at the ESL small board, the sensor 36 feeds the information back to the ESL small board, then the display 32 on the ESL small board is caused to light off to indicate completion of the task.

Further, as shown in FIG. 4, the ESL small board may further include a restorer 31, the restorer 31 detects a reset operation of the user and provides a task completion feedback to the receiving portion of the ESL small board. For example, the restorer 31 corresponds to a reset button.

For example, during material sorting management, when the task received by the ESL small board from the ESL mainboard is taking the material at the ESL small board, after the line operator takes the material at the ESL small board, the operator can press the restorer 31 to provide a task completion feedback to the receiving portion of the ESL small board so as to indicate completion of the task.

In another example, the ESL small board may also include other displays. For example, the displays may be digital displays.

For example, the ESL small board may include a digital display 34 for displaying an address of the ESL small board and a digital display 35 for displaying a remaining amount of material at the ESL small board. It should be realized that the number of digital displays included in the ESL small board is not limited thereto, and the ESL small board may include more or fewer digital displays. As described above, when inquiring the material information, the related material may be scanned by the scanner at the ESL mainboard or may be inputted at the controller end, wherein the related material inputted at the controller end may be address information of the material in the material pre-maintenance system, when the ESL small board receives a command for a task corresponding to address information of the material sent by the ESL mainboard, the display 32 of the ESL small board at this address emits light to indicate the task, meanwhile the digital displays 34, 35 will concurrently display the address and quantity of the corresponding material. Herein, when quantity of the same material is large, multiple material quantities can be set to the unit "1" and then displayed. For example, material with the quantity 100 can be set to display the unit "1".

In another example, the display may be digital displays 34, 35 that can be discolored. The digital displays 34, 35 can indicate the task by displaying different colors. For example, the digital displays 34, 35 can display red to indicate a task and green to indicate completion of the task. For example, when the corresponding ESL small board receives a command for a task corresponding to an address information of the material as sent by the ESL mainboard, the digital displays 34, 35 on the corresponding ESL small board display red to indicate the task and simultaneously display data, after the task is completed, color of the digital displays 34, 35 turns green, and no data is displayed, so as to indicate completion of the task, and optionally, the ESL small board sends a current remaining quantity of the material to the remote server through the first logic signal.

Alternatively, when the corresponding ESL small board receives the command for the task corresponding to the address information of the material as sent by the ESL mainboard, the display 32 on the corresponding ESL small board lights up or displays a first color to indicate the task, meanwhile data is displayed by the digital displays 34, 35, after the task is completed, the display 32 is caused to light off or the color changes to a second color to indicate completion of the task, meanwhile the digital display 34, 35 display no data, and optionally, the ESL small board sends a current remaining quantity of the material to the remote server through the first logic signal.

Steps of material sorting management according to some embodiments of the present disclosure will be described below with reference to FIG. 5.

Figure 5:
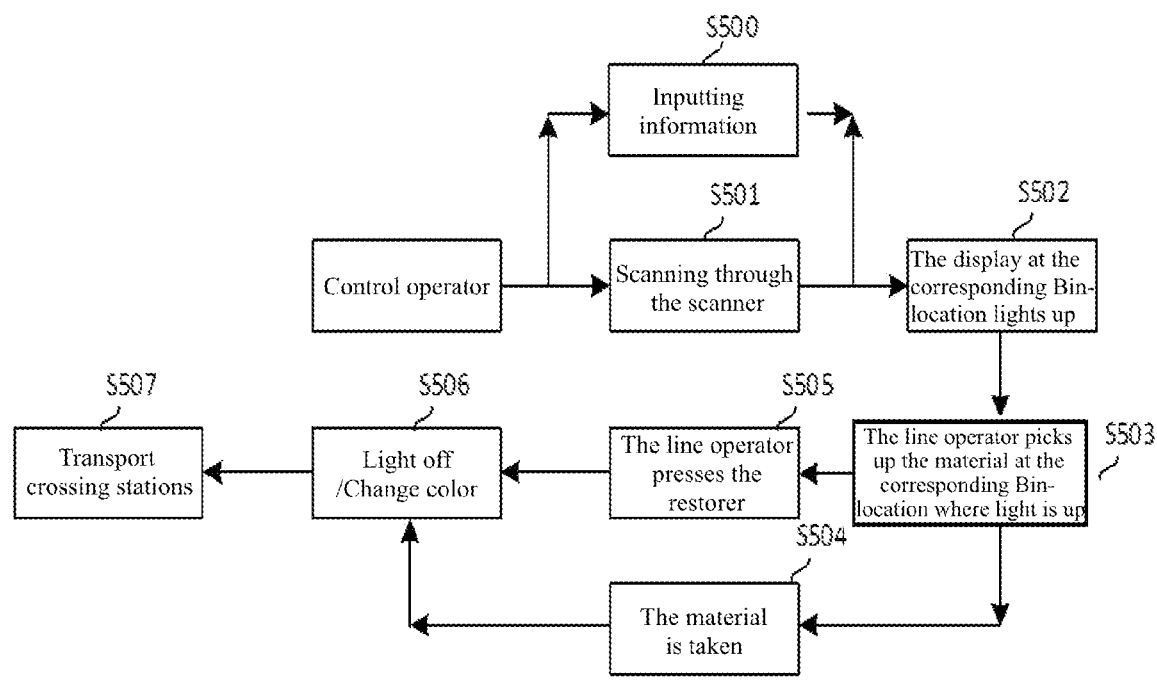
FIG. 5 shows steps of material sorting management according to some embodiments of the present disclosure.

As shown in FIG. 5, during material sorting management, for example, the control operator can input material related information (S500) at the controller end, or scan material through the scanner (S501), inputted related information or scanned material information is inputted to the ESL mainboard, then the ESL mainboard determines the corresponding ESL small board based on the inputted related information or the scanned material information, thereafter the ESL mainboard sends the command for the task to the corresponding ESL small board through the first logic signal. Then, the display 32 of the Bin-location at the corresponding ESL small board lights up (S502) to indicate the task, meanwhile the line operator finds the location of the corresponding ESL small board based on the display 32.

Next, as shown in FIG. 5, the line operator picks up the material at the corresponding position (S503). At this time, the corresponding material may be automatically taken (e.g., by a robot hand) or artificially taken (S504), information is fed back to the receiving portion of the ESL small board by, for example, a sensor, or the restorer is pressed by the line operator (S505) to feed information back to the receiving portion of the ESL small board, such that the display 32 on the ESL small board is caused to light off to indicate that the task is completed (S506). The material is then transported by the conveyor to stations for the next operations (S507).

In the application scenario of quickly affixing labels to products, the products need to be labeled before shipment, such as the product ID information label, the qualified label or various certification labels. The present disclosure can place multiple ESL small boards centrally at a location on the production line, wherein one ESL small board represents one type of label.

In some embodiments of the present disclosure, the apparatus for ESL management comprises an ESL mainboard that transmits a command for a task to an ESL small board through a first logic signal, and a plurality of ESL small boards each of which includes a receiving portion and a display portion, wherein the receiving portion of each ESL small board receives the command for the task corresponding to each ESL small board as sent by the ESL mainboard through the first logic signal, and the display portion of each ESL small board displays the task.

The first logic signal is a high voltage level or a low voltage level. For example, the first logic signal is a high voltage level or a low voltage level of general purpose input output. The ESL mainboard sends task commands to the ESL small boards through the first logic signal refers to that, when a command for a task of the ESL mainboard corresponds to one of the ESL small boards, the ESL mainboard sends the command for the task to this ESL small board through, for example, a high voltage level. Alternatively, the ESL mainboard may also send task commands to the ESL small boards by, for example, a low voltage level, which may be preset in the ESL mainboard.

Herein, for example, the command for the task may correspond to command information inputted by the control operator at the ESL mainboard. For example, the ESL mainboard may be connected to a device such as a scanner, which can identify the material by code scanning, when the line operator wants to obtain certain label, the label information can be scanned by the scanner at the ESL mainboard, and then the label identification information (e.g., initial serial number of the label) obtained by scanning is inputted to the ESL mainboard, then the ESL mainboard determines the corresponding ESL small board based on the scanned label information, next, the ESL mainboard sends a command for a task to the corresponding ESL small board through the first logic signal. Alternatively, for example, the command for the task may be automatically generated corresponding to one operation of a preset operation sequence.

For example, the command for the task may also correspond to label information inputted directly by the control operator on the controller 20. For example, the label name inputted at the controller 20 is sent by the controller 20 to the ESL mainboard, and then sent by the ESL mainboard to the corresponding ESL small board through the first logic signal. Alternatively, the command for the task may be automatically generated corresponding to one operation in an operation sequence/flow set in advance. For example, the operation sequence may be preset, such as order-picking, label affixing, etc., and when the pipeline is to perform the order-picking operation, a command for a task for the picking operation may be automatically generated.

Next, the receiving portion of each ESL small board receives the command for the task corresponding to each ESL small board as sent by the ESL mainboard through the first logic signal, and the display portion of each ESL small board displays the task.

In addition, the display portion of the ESL small board also displays a task completion status. In one example, the receiving portion of the ESL small board receives a task completion feedback and indicates a task completion by the display portion of each ESL small board.

Architecture of the ESL small board according to some embodiments of the present disclosure is described below with reference to FIG. 6.

Figure 6:
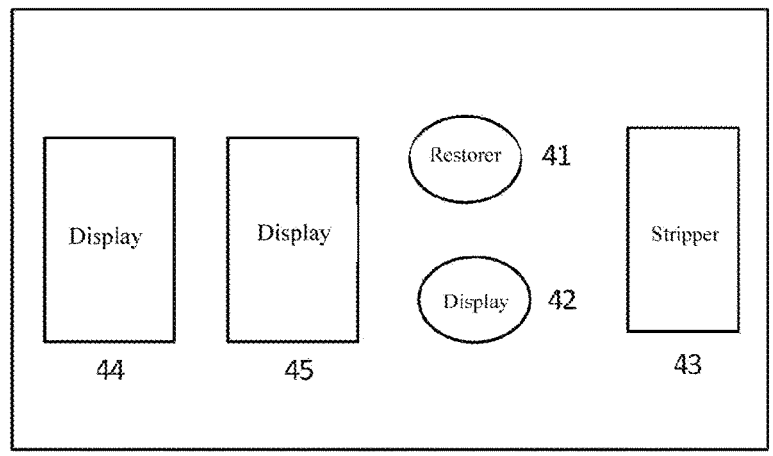
FIG. 6 shows a schematic diagram of architecture of ESL small boards according to some embodiments of the present disclosure.

As an example, as shown in FIG. 6, the display portion of the ESL small board may include a display 42, which is caused to emit light so as to indicate a task when the ESL small board receives a command for a task. For example, the display 42 may be a display lamp. For example, when the receiving portion of the ESL small board receives a command for a task sent by the ESL mainboard, the display 42 on the ESL small board emits light, so that the line operator can quickly locate this ESL small board.

When the receiving portion of the ESL small board receives a task completion feedback, the display 42 is caused to light off to indicate a task completion. Alternatively, the display 42 may indicate a task by displaying a different color (discoloration). For example, the display 42 may show red (a first color) to indicate a task and green (a second color) to indicate a task completion.

For example, the ESL small board may further include a stripper 43 (such as a label stripper), after the stripper 43 detects a stripping operation, it ejects a paper label and provides a task completion feedback to the receiving portion of the ESL small board.

For example, in the scenario of affixing labels, the ESL small board corresponds to different labels, the label affixing operation on the ESL small board can be controlled by the ESL mainboard. After the ESL mainboard sends a command for a task to the ESL small board through the first logic signal, the corresponding ESL small board receives the command for the task sent by the ESL mainboard, and causes the display 42 to emit light to indicate a task. At this time, the line operator can find the position of the corresponding ESL small board according to the display 42 that emits light or displays the first color, and strip off the corresponding paper label from the ESL small board, for example, after the ESL stripper detects, through a built-in sensor or the like, the stripping operation, the label stripper automatically spits out the next paper label and feeds information back to the ESL small board, at this time the display 42 is caused to light off or shows a second color to indicate completion of the task. In addition, it is also possible to automatically strip off the corresponding label from the corresponding ESL small board by a robot hand, thereby achieving full automation of the label striping. It should be noted that the above method of striping off the label is merely an example, and the method of striping off the ESL is not limited thereto, and other effective methods may also be used to strip off the label.

For example, in the scenario of affixing labels, a task completion feedback may be provided by re-scanning of the scanner. For example, when the control operator inputs information about the label to be searched for by scanning the label using a scanner connected to the ESL mainboard, after the operator removes the corresponding label, the operator can use the scanner connected to the ESL small board to scan the label again to feed back a completion of the task, when the feedback from the scanner is received, the indicator lamp of the ESL small board at the corresponding position is caused to light off to indicate completion of the task.

In addition, the ESL small board may further include a restorer 41, and the task completion feedback includes a reset operation fed back by the restorer 41.

For example, in the scenario of affixing labels, after the line operator removes the paper label at the ESL small board, the operator may press the restorer 41 to indicate completion of the task. When there is no paper label at the ESL small board, the operator may also press the restorer 41 to indicate completion of the task.

In addition, the ESL small board may also include other displays. For example, the displays may be digital displays.

For example, the ESL small board may include a digital display 44 for displaying an address of the ESL small board and a digital display 45 for displaying a remaining quantity of label at the ESL small board. It should be realized that the number of digital displays included in the ESL small board is not limited thereto, and the ESL small board may include more or fewer digital displays. As described above, when inquiring the label information, the related label may be scanned by the scanner at the ESL mainboard or may be inputted at the controller end, wherein the related label inputted at the controller end may be an address information of the label in the label pre-maintenance system, when the ESL small board receives a command for a task corresponding to the address information of the label sent by the ESL mainboard, the display 42 of the ESL small board at this address emits light to indicate the task, meanwhile the digital displays 44, 45 will concurrently display the address and quantity of the corresponding label. Herein, when quantity of the same label is large, multiple label quantities can be set to the unit "1" and then displayed. For example, tags with the quantity 100 can be set to display the unit "1".

In another example, the display may be digital displays 44, 45 that can be discolored. The digital displays 44, 45 can indicate the task by displaying different colors. For example, the digital displays 44, 45 can display red to indicate a task and green to indicate completion of the task. For example, when the corresponding ESL small board receives a command for a task corresponding to address information of the label sent by the ESL mainboard, the digital displays 44, 45 on the corresponding ESL small board displays red to indicate the task and simultaneously displays data, after the task is completed, color of the digital displays 44, 45 turns green, and no data is displayed, so as to indicate completion of the task, and optionally, the ESL small board sends a current remaining quantity of the label to the remote server through the first logic signal, for example, when the number of the label is reduced, the ESL small board feeds back a high voltage level to the remote server to indicate that the number of the label is less.

Alternatively, when the corresponding ESL small board receives the command for the task corresponding to an address information of the label as sent by the ESL mainboard, the display 42 on the corresponding ESL small board lights up or displays a first color to indicate the task, meanwhile data is displayed by the digital displays 44, 45, after the task is completed, the display 42 is caused to light off or the color changes to a second color to indicate completion of the task, meanwhile the digital display 44, 45 display no data, and optionally, the ESL small board sends a current remaining quantity of the label to the remote server through the first logic signal.

Steps of quickly affixing labels according to some embodiments of the present disclosure will be described below with reference to FIG. 7.

Figure 7:
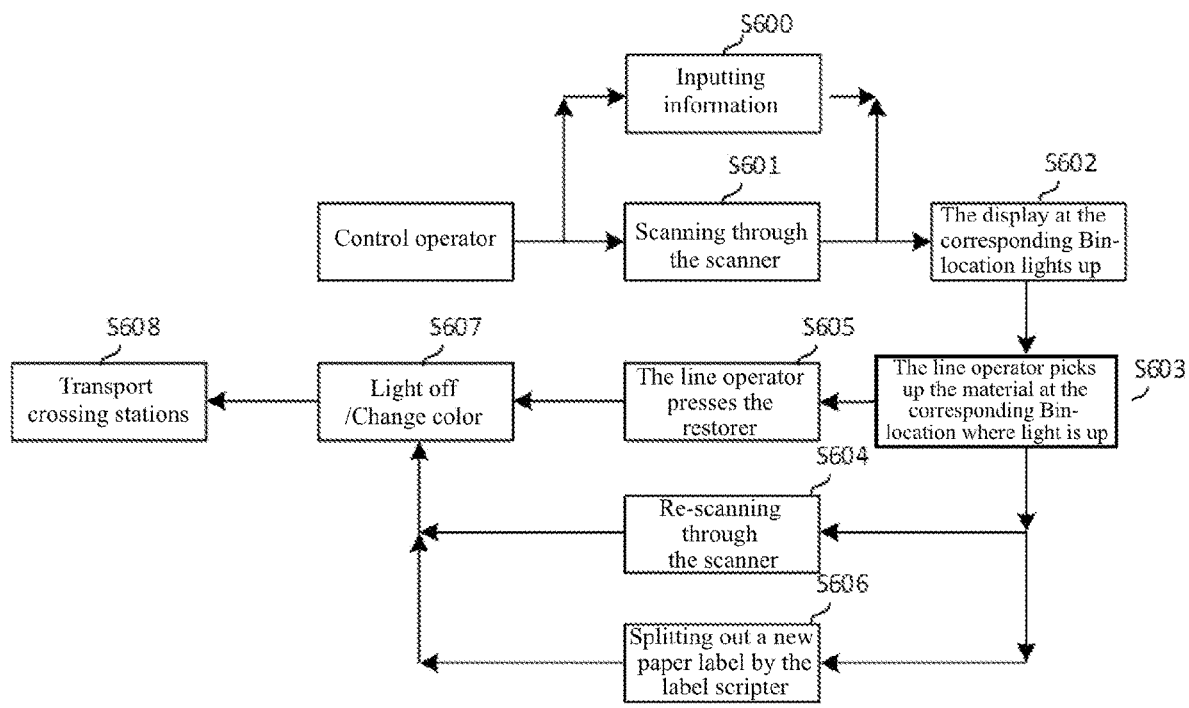
FIG. 7 shows steps of quickly affixing labels to products according to some embodiments of the present disclosure.

As shown in FIG. 7, in the scenario of affixing labels, for example, the control operator can input label related information (S600) at the controller end, or scan the label through the scanner (S601), inputted related information or scanned label information is inputted to the ESL mainboard, and then the ESL mainboard determines the corresponding ESL small board based on the inputted related information or the scanned label information, thereafter the ESL mainboard sends the command for the task to the corresponding ESL small board through the first logic signal. The display 42 of the Bin-location at the corresponding ESL small board is then lights up (S602) to indicate the task, meanwhile the line operator finds the location of the corresponding ESL small board based on the display 42.

Next, as shown in FIG. 7, the line operator picks up the label at the corresponding position (S603). At this time, information is fed back to the receiving portion of the ESL small board by, for example, that the label scrapper splits out a new paper label (S606), or the scanner scan the label again (S604), or the restorer 41 is pressed by the line operator (S605), such that the display 42 on the ESL small board is caused to light off to indicate that the task is completed (S607). The goods with label is then transported by the conveyor to stations for the next operations (S608).

As described above, the present disclosure provides a management scheme for ESL based on a first logic signal, which is hardly disturbed, has high stability, and is free from limitations of distance and transmission rate. The present disclosure mainly is applied to works such as factory warehouse material sorting management, inbound and outbound warehouse inquiry, factory pipeline operation, and product quick labeling of factory pipeline, etc., and provides innovative connection of the pipeline conveyor cylinder and the label stripper. The present disclosure also has advantages of simple equipment wiring, easy to operate, easy to maintain and low cost.

Figure 8:
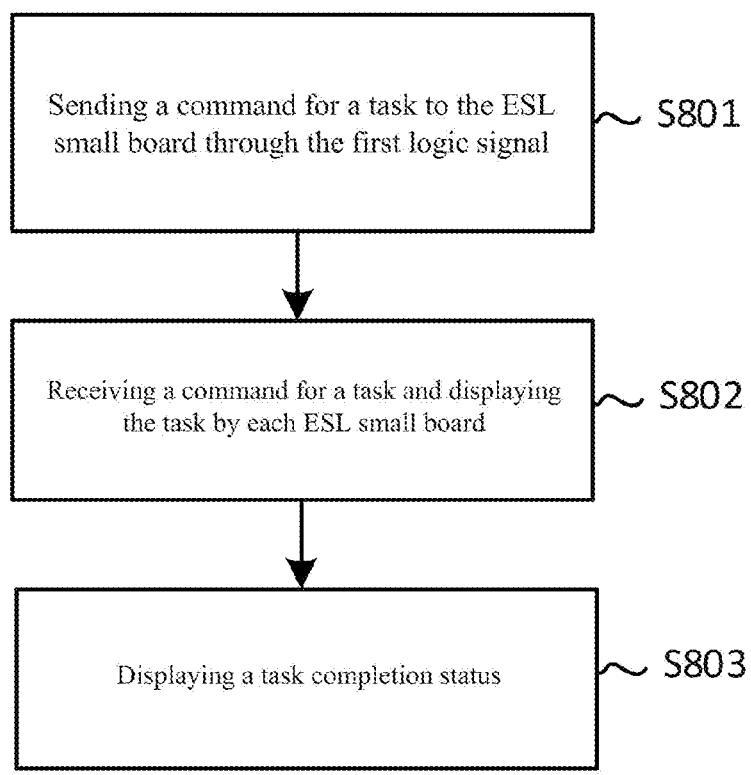
FIG. 8 shows a flow chart of the method for management of ESL according to embodiments of the present disclosure.

FIG. 8 illustrates a flow chart of a method for management of ESL according to embodiments of the present disclosure. The method for management of ESL according to embodiments of the present disclosure will be described below with reference to FIG. 8. Since details of the method for management of ESL in this embodiment are the same as those of the apparatus described above with reference to FIGS. 1 through 7, detailed description of the same content is omitted here for the sake of simplicity.

Hereinafter, the manners of the method for management of ESL being applied to material sorting management and quickly affixing labels to products according to the embodiment of the present disclosure will be described in detail separately.

First, the application scenario of material sorting management will be described in detail.

As shown in FIG. 8, the method for management of ESL includes sending a command for a task to the ESL small board through the first logic signal (S801).

The first logic signal is a high voltage level or a low voltage level. The ESL mainboard sends a command for a task to the ESL small boards through the first logic signal refers to that, when a command for a task of the ESL mainboard corresponds to one of the ESL small boards, the ESL mainboard sends the command for the task to this ESL small board through, for example, a high voltage level. Alternatively, the ESL mainboard may also send a command for a task to the ESL small board by, for example, a low voltage level, which may be preset in the ESL mainboard Herein, for example; the command for the task may correspond to command information inputted by the control operator at the ESL mainboard. For example, the ESL mainboard may be connected to a device such as a scanner, which can identify the material by code scanning, when the line operator wants to obtain certain material, the control operator can scan the material by the scanner at the ESL mainboard and then inputs the material identification information (e.g., RQ code information of the material) obtained by scanning to the ESL mainboard, then the ESL mainboard determines the corresponding ESL small board based on the scanned material information, next, the ESL mainboard sends a command for a task to the corresponding ESL small board through the first logic signal.

For example, the command for the task may also correspond to material information inputted directly by the control operator on the controller 20. For example, the material name inputted at the controller 20 is then sent by the controller 20 to the ESL mainboard, and then sent by the ESL mainboard to the corresponding ESL small board through the first logic signal.

Next, each ESL small board receives a command for a task corresponding to each ESL small board as sent by the ESL mainboard and displays the task (S802). Each ESL small board corresponds to one type of ESL or material.

For example, each ESL small board of the plurality of ESL small boards includes a receiving portion and a display portion, the receiving portion receives, through the first logic signal, a command for a task corresponding to the ESL small board as sent by the ESL mainboard and the display portion of the ESL small board displays the task.

Optionally, the method further comprises displaying a task completion status by using the ESL small board (S803). In one example, the ESL small board is used to receive a task completion feedback and indicate a task completion.

As an example, the ESL small board (e.g., the display portion of the ESL) may include a display (such as a display lamp), when the ESL small board receives a command for a task, the display is caused to emit light so as to indicate a task. For example, after the ESL small board receives a command for a task sent by the ESL mainboard, the display on the ESL small board emits light, so that the line operator can quickly locate the ESL small board.

When the ESL small board receives a task completion feedback, the display is caused to light off to indicate that the task is completed. Alternatively, the display may indicate a task by displaying different colors. For example, the display may display red to indicate a task and green to indicate completion of the task.

For example, the ESL small board further includes a sensor, the sensor detects an operation of the material on an automatic shelf being transported and provides a task completion feedback to the receiving portion of the ESL small board. During material sorting management, when the ESL small board receives the task of taking the material located at the ESL small board as sent from the ESL mainboard, the sensor 36 may be disposed at the ESL small board, after the small board receives the task, for example, the material at the ESL small board can be placed on the automatic shelf by a robot hand or the line operator, and the sensor on the ESL small board detects removal of the material at the ESL small board, the sensor feeds the information back to the ESL small board, then the display 32 on the ESL small board is caused to light off to indicate completion of the task.

Further, the ESL small board may further include a restorer, the restorer detects a reset operation of the user and provides a task completion feedback to the receiving portion of the ESL small board.

For example, during material sorting management, when the task received by the ESL small board from the ESL mainboard is taking the material at the ESL small board, after the line operator takes the material at the ESL small board, the operator can press the restorer to provide a task completion feedback to the receiving portion of the ESL small board so as to indicate completion of the task.

Next, the application scenario of management of quickly affixing labels to products will be described in detail.

As shown in FIG. 8, the method for management of ESL sends a command for a task to the ESL small board through the first logic signal (S801).

The first logic signal is a high voltage level or a low voltage level. As described above, the ESL mainboard sends task commands to the ESL small boards through the first logic signal refers to that, when a command for a task of the ESL mainboard corresponds to one of the ESL small boards, the ESL mainboard sends the command for the task to this ESL small board through, for example, a high voltage level. Alternatively, the ESL mainboard may also send a command for a task to the ESL small board by, for example, a low voltage level, which may be preset in the ESL mainboard.

Herein, for example, the command for the task may correspond to command information inputted by the control operator at the ESL mainboard. For example, the ESL mainboard may be connected to a device such as a scanner, which can identify the material by code scanning, when the line operator wants to obtain certain label, the label information can be scanned by the scanner at the ESL mainboard, and then the label identification information (e.g., initial serial number of the label) obtained by scanning is inputted to the ESL mainboard, then the ESL mainboard determines the corresponding ESL small board based on the scanned material information, next, the ESL mainboard sends a command for a task to the corresponding ESL small board through the first logic signal. Alternatively, for example, the command for the task may be automatically generated corresponding to one of a preset operation sequences.

For example, the command for the task may also correspond to information directly inputted by the control operator on the controller 20. For example, the label name inputted by the controller 20 is then sent by the controller 20 to the ESL mainboard, and then sent to the corresponding ESL small board by the ESL mainboard through the first logic signal.

Next, each ESL small board receives a command for a task corresponding thereto as sent by the ESL mainboard, and displays the task (S802). Herein, each ESL small board corresponds to one type of ESL or material.

For example, the plurality of ESL small boards may each include a receiving portion and a display portion, wherein the receiving portion of each ESL small board receives, through the first logic signal, a command for a task corresponding to each ESL small board as sent by the ESL mainboard, and displays the task by the display portion of each ESL small board.

Optionally, the ESL small board also displays a task completion status (S803). In one example, the ESL small board receives a task completion feedback and indicates a task completion.

As an example, the ESL small board may include a display (such as a display lamp), when the ESL small board receives a command for a task, the display is caused to emit light so as to indicate a task. For example, after the ESL small board receives the command for the task sent by the ESL mainboard, the display on the ESL small board emits light, so that the line operator can quickly locate this ESL small board.

When the receiving portion of the ESL small board receives a task completion feedback, the display is caused to light off to indicate a task completion. Alternatively, the display may indicate a task by displaying a different color (discoloration). For example, the display may show red (a first color) to indicate a task and green (a second color) to indicate a task completion.

For example, the ESL small board (e.g., the receiving portion of the ESL small board) may further include a stripper (such as a label stripper), after the stripper detects a stripping operation, it ejects a paper label and generates a task completion feedback.

For example, in the scenario of affixing labels, the ESL small boards correspond to different labels, the label labeling operation on the ESL small board can be controlled by the ESL mainboard. After the ESL mainboard sends a command for a task to the ESL small board through the first logic signal, the corresponding ESL small board receives the command for the task sent by the ESL mainboard, and causes the display to emit light so as to indicate a task. At this time, the line operator can find the position of the corresponding ESL small board according to the display that emits light or displays the first color, and strip off the corresponding paper label from the ESL small board, for example, after the ESL stripper detects, through a built-in sensor or the like, the striping operation, the label stripper automatically spits out the next paper label and feeds information back to the ESL small board, at this time the display is caused to light off or shows a second color to indicate completion of the task. It should be noted that the above method of striping off the label is merely an example, and the method of striping off the ESL is not limited thereto, and other effective methods may also be used to strip off the label.

For example, in the scenario of affixing labels, a task completion feedback may be provided by re-scanning of the scanner. For example, when the control operator inputs information about the label to be searched for by scanning the label using a scanner connected to the ESL mainboard, after the operator removes the corresponding label, the operator can use the scanner connected to the ESL mainboard to scan the label again to feed back a completion of the task, when the feedback from the scanner is received, the indicator lamp of the ESL small board at the corresponding position is caused to light off to indicate completion of the task.

In addition, the ESL small board may further include a restorer (such as a reset button), and the task completion feedback includes a reset operation fed back by the restorer.

For example, in the scenario of affixing labels, after the line operator removes the paper label at the ESL small board, the operator can press the restorer to indicate completion of the task. When there is no paper label at the ESL small board, the operator can also press the restorer to indicate completion of the task.

The present disclosure provides an apparatus and method for management of electronic shelf label, in which a command for a task is send based on a first logic signal. The first logic signal may be a high voltage level or a low voltage level of general purpose input output (GPIO), which is hardly disturbed, has high stability, and is free from limitations of distance and transmission rate. The embodiments of the present disclosure mainly are applied to works such as factory warehouse material sorting management, inbound and outbound warehouse inquiry, factory pipeline operation, and product quick labeling of factory pipeline, etc., and provides innovative connection of the pipeline conveyor cylinder and the label stripper, the present disclosure also has advantages of simple equipment wiring, easy to operate, easy to maintain and low cost.

The embodiments of the present disclosure may also be implemented as a computer-readable storage medium. Computer-readable instructions are stored on the computer-readable storage medium in accordance with an embodiment of the present disclosure. When the computer-readable instructions are executed by a processor, the method for management of electronic shelf label according to embodiments of the present disclosure described with reference to the above drawings may be performed. The computer-readable storage medium includes, but not limited to, for example, volatile memory and/or nonvolatile memory. The volatile memory may include, for example, random access memory (RAM) and/or cache or the like. The nonvolatile memory may include, for example, read only memory (ROM), hard disk, flash memory, or the like.

A person skilled in the art will appreciate that many variations and modifications may be made to the contents revealed by the present disclosure. For example, various apparatus or devices described above may be implemented in hardware, or may be implemented by software, firmware, or a combination of some or all of the three.

Moreover, although the present disclosure makes various references to certain circuits or devices in the system according to the embodiments of the present disclosure, different circuits or devices of any number may be used and run on a client and/or server. As will be appreciated by a person of ordinary skill in the art, all or parts of the steps in the above embodiments may be implemented by a program instruction relevant hardware, the program may be stored in a computer-readable storage medium, such as read-only memory, magnetic disc, optical disk, or the like. Optionally, all or parts of the steps of the above embodiments may also be implemented using one or more integrated circuits. Correspondingly, each module/unit in the above embodiments may be implemented in form of hardware, or may be implemented in faun of software functional module. The present disclosure is not limited to any specific form of combination of hardware and software.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Unless otherwise defined, all terms (including technical and scientific terms) used herein have the same meaning as commonly understood by a person of ordinary skill in the art to which this invention belongs. It will be further understood that the terms, such as those defined in commonly used dictionaries, should be interpreted as having a meaning that is consistent with their meaning in the context of the relevant art and will not be interpreted in an idealized or overly formal sense unless expressly so defined herein.

The above is illustration of the present disclosure and should not be construed as making limitation thereto. Although some exemplary embodiments of the present disclosure have been described, a person skilled in the art can easily understand that many modifications may be made to these exemplary embodiments without departing from the creative teaching and advantages of the present disclosure. Therefore, all such modifications are intended to be included within the scope of the present disclosure as defined by the appended claims. As will be appreciated, the above is to explain the present disclosure, it should not be constructed as limited to the specific embodiments disclosed, and modifications to the present disclosure and other embodiments are included in the scope of the attached claims. The present disclosure is defined by the claims and their equivalents.

The present application claims the priority of the Chinese patent application No. 201810379405.9 filed on Apr. 25, 2018, which is incorporated as part of the present application by reference herein in its entirety.

What is claimed is:

1. An apparatus for management of electronic shelf label, ESL, comprising an ESL mainboard and a plurality of ESL small boards, wherein
the ESL mainboard sends task commands to the plurality of ESL small boards through a first logic signal; and
each ESL small board of the plurality of ESL small boards includes a receiving portion and a display portion, the receiving portion receives, through the first logic signal, a command for a task corresponding to the ESL small board as sent by the ESL mainboard, and the display portion displays the task,
wherein the first logic signal is a high voltage level or low voltage level of general purpose input output (GPIO).

2. The apparatus according to claim 1, wherein the display portion of the ESL small board further displays a task completion status.

3. The apparatus according to claim 2, wherein the receiving portion of the ESL small board receives a task completion feedback and the display portion of each ESL small board indicates a task completion.

4. The apparatus according to claim 3, wherein the display portion of the ESL small board includes a display, which is caused to emit light to indicate a task when the ESL small board receives a command for a task.

5. The apparatus according to claim 4, wherein when the receiving portion of the ESL small board receives a task completion feedback, the display is caused to light off to indicate a task completion.

6. The apparatus according to claim 3, wherein the ESL small board further comprises a sensor that detects an operation of the material on an automatic shelf being transported and provides a task completion feedback to the receiving portion of the ESL small board.

7. The apparatus according to claim 3, wherein the ESL small board further includes a restorer that detects a reset operation of a user and provides a task completion feedback to the receiving portion of the ESL small board.

8. The apparatus according to claim 3, wherein the ESL small board further includes a stripper that ejects a paper label after detecting a stripping operation and provides a task completion feedback to the receiving portion of the ESL small board.

9. The apparatus according to claim 1, wherein each ESL small board corresponds to one type of ESL.

10. A method for management of electronic shelf label, ESL, comprising:
sending, by using an ESL mainboard, a command for a task to each ESL small board of a plurality of ESL small boards through a first logic signal, wherein the first logic signal is a high voltage level or a low voltage level of general purpose input output (GPIO); and
receiving, by using each ESL small board, the command for a task corresponding to the ESL small board as sent by the ESL mainboard, and displaying, by using each ESL small board, the task.

11. The method for management of ESL according to claim 10, further comprising displaying a task completion status by using the ESL small board.

12. The method for management of ESL according to claim 11, further comprising receiving a task completion feedback and indicating a task completion, by using the ESL small board.

13. The method for management of ESL according to claim 12, wherein the ESL small board includes a display, the method further comprises: when the ESL small board receives a command for a task, causing the display to emit light to indicate a task.

14. The method for management of ESL according to claim 13, further comprising, when the ESL small board receives a task completion feedback, causing the display to light off to indicate a task completion.

15. The method for management of ESL according to claim 14, wherein the ESL small board further includes a stripper, and after the stripper detects a stripping operation, a paper label is ejected and a task completion feedback is generated by using the stripper.

16. The method for management of ESL according to claim 10, wherein the first logic signal is a high voltage level or a low voltage level of general purpose input output (GPIO).

17. The method for management of ESL according to claim 10, wherein each ESL small board corresponds to one type of ESL.

* * * * *